United States Patent [19]
Maus

[11] Patent Number: 5,042,625
[45] Date of Patent: Aug. 27, 1991

[54] DAMPING UNIT

[75] Inventor: Ralf Maus, Holzhausen, Fed. Rep. of Germany

[73] Assignee: Stabilus GmbH, Koblenz-Neuendorf, Fed. Rep. of Germany

[21] Appl. No.: 551,494

[22] Filed: Jul. 11, 1990

[30] Foreign Application Priority Data

Jul. 15, 1989 [DE] Fed. Rep. of Germany ....... 3923512

[51] Int. Cl.$^5$ ................ F16F 9/348; F15B 15/22; B62K 21/08
[52] U.S. Cl. .................... 188/280; 188/282; 188/317; 188/322.15; 188/322.22; 188/298
[58] Field of Search .......... 188/280, 281, 282, 322.15, 188/322.22, 313, 314, 316, 317, 318, 298, 319; 137/517, 513.3, 513.5, 493.8, 493; 280/96; 267/64.15, 64.23, 120, 124

[56] References Cited

U.S. PATENT DOCUMENTS

| | | | |
|---|---|---|---|
| 2,310,570 | 2/1943 | Briggs . | |
| 3,627,346 | 12/1971 | Dorner et al. | 280/96 X |
| 3,896,908 | 7/1975 | Petrak | 188/280 |
| 4,768,627 | 9/1988 | Taylor | 188/280 |
| 4,895,229 | 1/1990 | Kato | 188/282 |
| 4,961,482 | 10/1990 | Pohlenz et al. | 188/280 |

FOREIGN PATENT DOCUMENTS

| | | |
|---|---|---|
| 189938 | 5/1957 | Austria . |
| 2032688 | 11/1970 | France . |
| 2512147 | 3/1983 | France . |

Primary Examiner—Douglas C. Butler
Attorney, Agent, or Firm—Brumbaugh, Graves, Donohue & Raymond

[57] ABSTRACT

In a damper for a steering device of a motor vehicle and more particularly a motor cycle a piston rod is axially movable with respect to the cylinder. The piston rod is provided with a piston inside the cylinder. The piston is provided with axial bores. The axial bores open into valve seat faces of the piston. Valve rings are allocated to the valve seat faces. Helical compression springs are located within the bores. These springs urge the valve rings towards respective opening positions. The valve rings are movable towards respective damping positions in response to the axial movement of the piston rod with respect to the cylinder. The valve rings have valve faces opposite to the respective valve seat faces. The valve faces are provided with projections towards the valve seat faces and with recesses adjacent these projections. So, a restricted fluid communication is obtained in the damping position of the respective valve ring.

12 Claims, 2 Drawing Sheets

DAMPING UNIT

BACKGROUND OF THE INVENTION

Damping units are used in motor vehicles and prticularly in motor cycles for damping the movement of the respective steering device. More particularly they serve to damp undesired steering deflections stimulated for example by road-way irregularities. On the other hand, the damping unit should exert only small or essetially no damping effect on the steering device in normal slow steering operation.

From U.S. Pat. No. 2,310,570 a damping unit for a motor vehicle is known. A piston rod is axially movable with respect to a cylinder. A piston unit is fixed to the piston rod within the cylinder and divides the cavity within the cylinder into two working chambers. the piston unit comprises a carrier member with axial bores. Valve plates are provided on both end faces of the carrier member,. Helical compression springs are located within the bores and urge the valve plates towards respective opening positions. On fast movement of the piston rod the pressure in one of the working chambers is increased and the respective valve plate is urged towards a damping position against the action of the springs. The valve plates are star-shaped with a plurality of arms allocated to respective bores. The valve plates are prevented from rotation so that they remain in axial alignment with the bores. The valve plates are made of bimetallic material. In the damping position of the valve plates there is no definite flow resistance through the piston unit, such that the piston rod may be completely blocked with respect to the cylinder.

OBJECT OF THE INVENTION

It is an object of the present invention to provide a damping unit in which a defined communication between the working chambers exists even in the maximum damping position of the valve members, such that a high damping force is achieved, and blocking is avoided.

SUMMARY OF THE INVENTION

In consideration of the above object a damping unit comprises a cylinder having an axis and two cylinder ends. A cavity is defined within the cylinder between the two cylinder ends. A piston rod is sealingly guided through at least one of the two cylinder ends and extends axially movable inwards and outwards of the cavity. The piston rod is provided with a piston unit within the cavity. The piston unit separates two working chambers from each other within the cavity. The working chambers contain a damping fluid, and more particularly a damping liquid, such as a damping oil. The piston unit comprises a carrier member substantially fixed with respect to the piston rod. The carrier member is provided with a plurality of axial bores. The axial bores have two respective bore ends opening into respective valve seat faces of the carrier member. The valve seat faces are substantially perpendicular to the axis and adjacent respective working chambers. Two respective annular valve members are allocated to the respective valve seat faces. The valve members have respective radially outer and radially inner peripheral faces and a respective valve face opposite to a respective valve seat face. The valve members are axially movable relative to the respective valve seat faces between a respective damping position closer to the respective valve seat face and a respective opening position more remote from the respective valve seat face. The valve members are axially bridged by at least one substantially axially extending gap adjacent at least one of the respective radially outer and radially inner peripheral faces. A plurality of respective compression springs are provided within at least part of the axial bores extending therethrough. These compression springs have respective opposite ends engaging both valve members and urging them towards the respective opening position. The valve members approach the respective damping positions in response to increased pressure of damping fluid in the respective working chamber resulting from increased axial speed of movement of the piston unit in a respective axial direction with respect to the cylinder. At least one face of a pair of a valve seat face and a valve face allocated to each other is provided with axial projection means and recess means. The projection means engage the other face of the pair in the respective damping position. The recess means and the at least one gap provide in the respective damping position a restricted flow communication for the damping fluid from the respective bore ends to the respective working chamber.

This restricted flow communication provides in the damping position a well defined maximum flow resistance for the damping fluid.

The damping unit has a low damping resistance at a slow relative movement of the cylinder and the piston rod. In case of shock forces acting onto the steering device the bores are closed almost suddenly against the pressure of the springs, but a definite flow cross-section remains so that blocking of the steering device is avoided.

The damping fluid is preferably a damping liquid. In such case it may be necessary to provide an elastically compressible compensation volume within the cavity.

At least one of the peripheral faces may be provided with axially extending grooves.

At least one of the valve members may be received within an annular space of the carrier member. This annular space may be confined by the respective valve seat face, by a radially inner space confining face, and by a radially outer space confining face, and is open towards the respective working chamber.

The radially inner space confining face and the radially outer space confining face may be provided by respective sleeve members integral with the carrier member.

The valve members may be rotatable with respect to the carrier member without substantial variation of the flow resistance for said damping fluid across said piston unit. This is a considerable advantage over the prior art according to the U.S. Pat. No. 2,310,570, in which the arms of the star-shaped valve member must be angularly adjusted with respect to the carrier member.

The compression springs may be helical compression springs.

The valve face of at least one of the annular valve members may be provided with a radially inner annular recess and with a radially outer annular projection. This radially outer annular projection is provided with radially extending grooves distributed about the circumference of the annular projection. The axial bores may be substantially in axial alignment with the respective annular recess. At least one of the valve members may have a rigid structure. The end face of at least one of the valve members is preferably substantially coplanar with a respective end face of the carrier member in the respective opening position.

At least one of the annular valve members may have an inner diameter larger than the diameter of the radially inner space confining face and have axially extending grooves in its radially outer peripheral face. Such an annular gap is confined between the radially inner peripheral face of the valve member and the radially inner space confining face. This annular gap is substantially closed in the opening position of the valve member by an abutment face fixed with respect to the piston rod and substantially coplanar with the respective end face of the carrier member.

The radial grooves and the axial grooves may be located in common planes containing the axis of the piston rod such that the damping liquid can directly flow from a radial groove into a respective axial groove, and vice versa.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which.

DETAILED DESCRIPTION OF THE PREFERRED EMBODIMENTS

Figure 1:
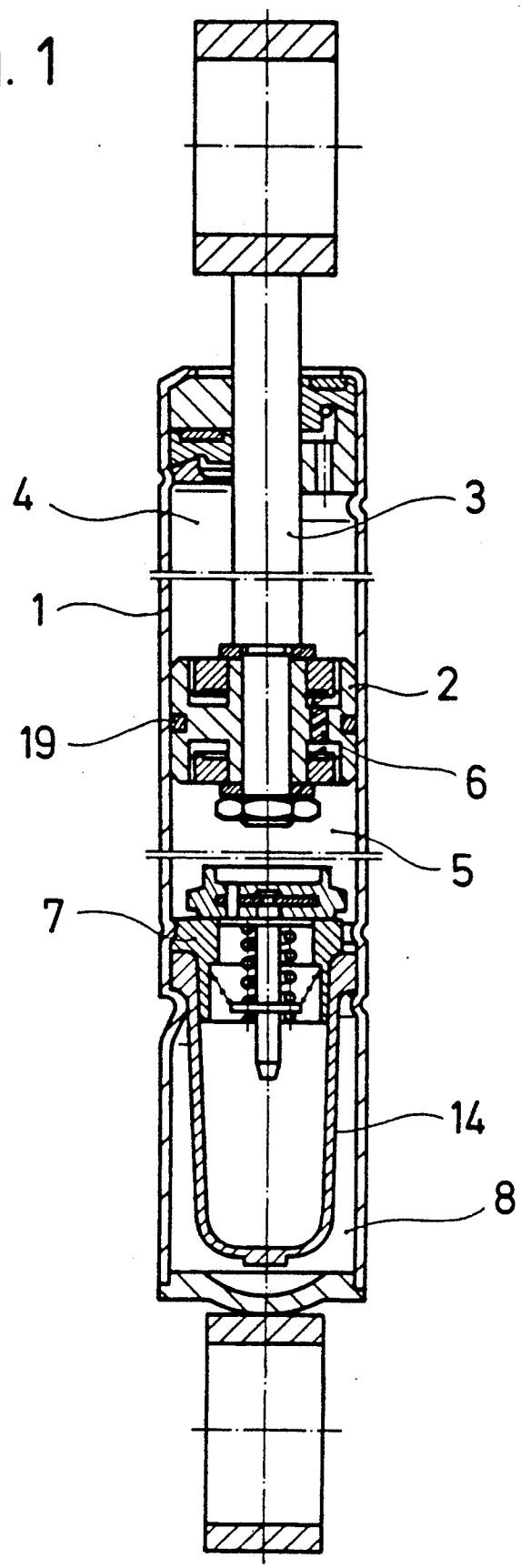
FIG. 1 shows a longitudinal section through a steering damper in accordance with the invention.

The steering damper as represented in FIG. 1, for example for a motor cycle of the upper power class, consists essentially of a tubular cylinder 1, the interior of which is divided by a piston unit 2 into two working chambers 4 and 5. The piston unit 2 is fastened to a piston rod 3 axially movable with respect to the cylinder 1. The lower working chamber 5 is separated by a bottom valve unit 7 from a compensating chamber 8 in which an elastic diaphragm 14 is arranged for the reception of the respective volume of damping liquid expelled by the entering piston rod 3. The working chambers 4 and 5 are filled with a liquid, preferably a damping oil. The piston unit 2 is provided with a gasket 19 sealingly engaging the inner surface of the cylinder 1.

Figure 2:
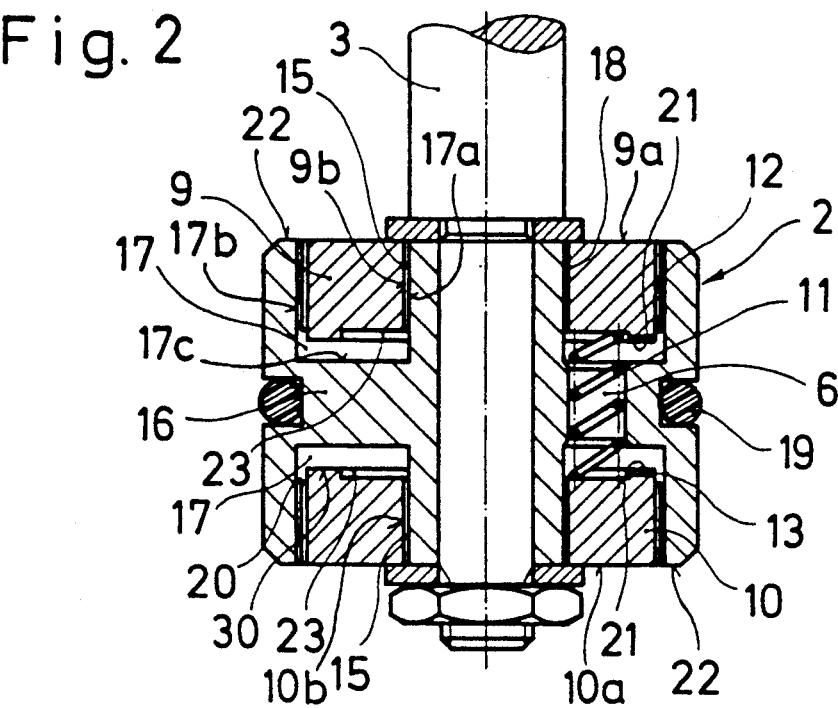
FIG. 2 shows in an enlarged scale a longitudinal section through the piston unit of the steering damper.

As FIG. 2 shows, the carrier member 16 comprises a plurality of axial bores 6, in which helical compression springs are guided as valve springs 11. In both axially outer end faces 22 of the carrier member 16 there are provided annular spaces 17 which are confined by a radially inner space confining face 17a, a radially outer space confining face 17b, and a valve seat face 17c. Annular valve members 9 and 10 are inserted into the annular spaces 17. In the state of rest, i.e. in the opening position illustrated in FIG. 2, the valve members 9 and 10 terminate with end faces 9a and 10a flush with the axially outer end faces 22.

The axial length of the valve members 9 and 10 is less than the axial depth of the annular spaces 17, so that axial free spaces remain in which the bores 6 open under the valve members 9 and 10.

The valve members 9 and 10 have with their radially inner peripheral face 9b and 10b a radial clearance 15 in relation to the radially inner space confining faces 17a and are provided with axially extending grooves 12 on their radially outer peripheral face 20. On their axially inner valve faces 21 the valve members 9 and 10 have annular projections 30 with radially extending grooves 13 which are in flow connection radially outwards with the axial grooves 12 and radially inwards with annular recesses 23. The annular recesses 23 serve at the same time for supporting the valve springs 11.

The function of the piston unit 2 in accordance with the invention will be described below with reference to the example of embodiment as described above. In the case of low speed of the piston rod and correspondingly low speed of the damping fluid, the two valve members 9 and 10 are held in their opening positions flush with the outer end faces 22 in the position as illustrated in FIG. 2, by the valve springs 11. The damping oil flows through the piston unit 2 by way of the axial grooves 12, the annular gap 15 and through the bores 6, which are of such large cross-sectional dimensions that a very low flow resistance and thus a very slight damping of the piston unit 2 occur.

If the flow speed increases, that is if the piston rod 3 is moved by reason of quicker steering deflections into the cylinder 1 and out of the cylinder 1 with increased speed, in each case a pressure build-up occurs adjacent the respective valve members 9 and 10. This pressure build-up effects an axial displacement of a respective member 9 or 10, whichever is adjacent the working chamber being reduced in volume, if a predetermined force acts onto the respective valve member. This force can be predetermined by the spring rigidity and the prestress of the valve springs 11. So, the bores 6 are largely closed. Now as the only flow connection the way remains through the axial grooves 12 and the radial grooves 13, which are still in flow connection with the bores 6 as before. It is assumed here that the cross-section of the annular gap 15 is negligible. Alternatively, the annular recess 23 may be confined radially inwards by a further projection.

Figure 3:
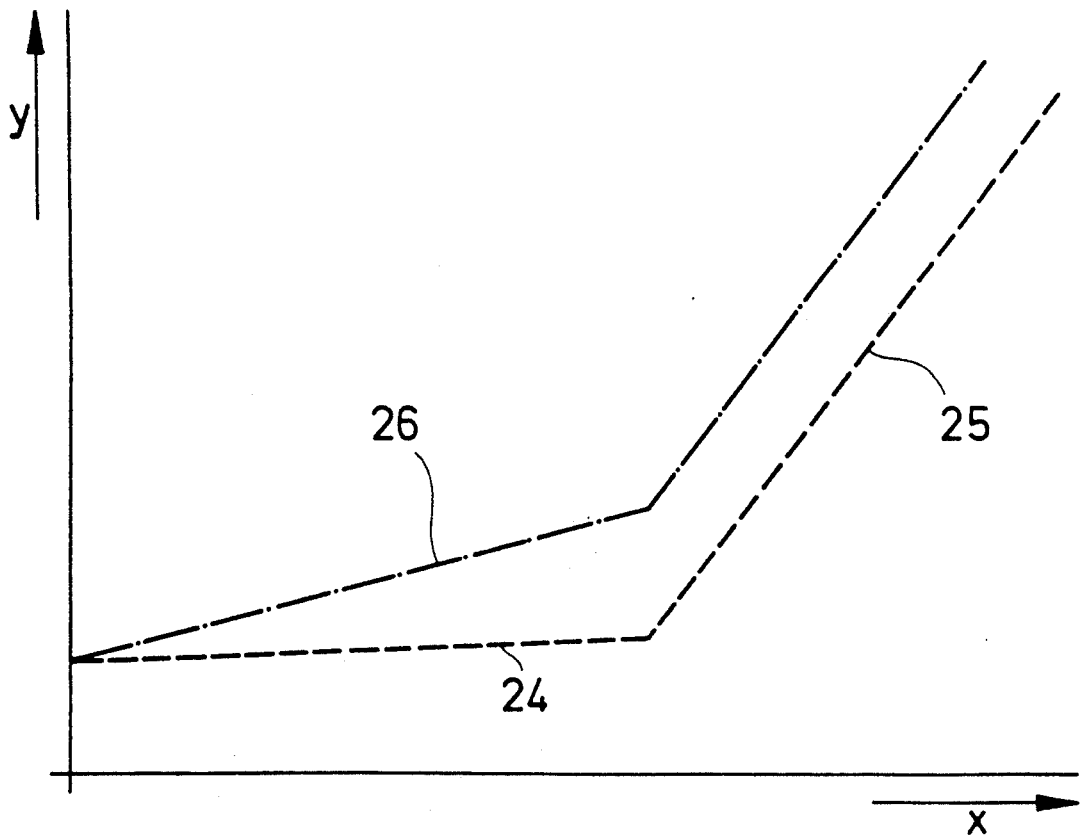
FIG. 3 shows a damping force-speed diagram.

As represented in FIG. 3 by reference to a damping force-speed diagram, the flow resistance is initially very low at low speeds, in accordance with the flatly rising damping force characteristic curve range 24. At higher flow speeds the damping force rises steeply in accordance with the characteristic curve range 25. In FIG. 3 the speed of the piston rod is plotted along the horizontal axis x in mm/s, and the damping force is plotted along the vertical axis y in N. Due to the measures according to the invention an extremely progressive course of the overall characteristic curve is produced with an almost sudden transition from the very flat range 24 to the steep range 25 as compared with older damping units of the applicant, in which in the lower speed range a greater rise of the damping force is already observable, as shown by the characteristic curve 26 in FIG. 3.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A damping unit comprising
a cylinder (1) having an axis and two cylinder ends, a cavity (4,5) being confined within said cylinder (1) between said two cylinder ends, a piston rod (3) sealingly guided through at least one of said two cylinder ends and axially movably extending inwards and outwards of said cavity (4,5), said piston rod (3) being provided with a piston unit (2) within said cavity (4,5), said piston unit (2) separating two working chambers (4,5) from each other within said cavity (4,5), said working chambers (4,5) containing a damping fluid, said piston unit (2) comprising a carrier member (16) fixed with respect to said piston rod (3), said carrier member (16) being provided with a plurality of axial bores (6), said axial bores (6) having two respective bore ends opening into respective valve seat faces (17c) of said carrier member (16), said valve seat faces (17c) being substantially perpendicular to said axis and adjacent respective working chambers (4,5), two respective annular valve members (9,10) being allocated to the respective valve seat faces (17c), said valve members (9,10) having respective radially outer and radially inner peripheral faces (20,9b) and a respective valve face (21) opposite to a respective valve seat face (17c), said valve members (9,10) being axially movable relative to the respective valve seat faces (17c) between a respective damping position closer to the respective valve seat face (17c) and a respective opening position more remote from the respective valve seat face (17c), said valve members (9,10) being axially bridged by at least one substantially axially extending gap (15) adjacent at least one of the respective radially outer and radially inner peripheral faces (20,9b), a plurality of respective compression springs (11) being provided within at least part of said axial bores (6) and extending therethrough, said compression springs (11) having respective opposite ends engaging both valve members (9,10) and urging them towards the respective opening position, said valve members (9,10) approaching the respective damping positions in response to increased pressure of damping fluid in the respective working chamber (4,5) resulting from increased axial speed of movement of said piston unit (2) in a respective axial direction with respect to said cylinder (1), characterized in that at least one face (21) of a pair of a valve seat face (17c) and a valve face (21) allocated to each other is provided with axial projection means (30) and recess means (23,13), said projection means (30) engaging the other face (17c) of said pair in the respective damping position, said recess means (23,13) and said at least one gap (15) providing in said respective damping position a restricted flow communication for said damping fluid from the respective bore ends to the respective working chamber (4,5).

2. A damping unit as claimed in claim 1, at least one of said peripheral faces (20,9b) being provided with axial extending grooves (12).

3. A damping unit as claimed in claim 1 at least one of said valve members (9,10) being received within an annular space (17) of said carrier member (16), said annular space (17) being confined by the respective valve seat face (17c), by a radially inner space confining face (17a) and a radially outer space confining face (17b) and being open towards the respective working chamber (4,5).

4. A damping unit as claimed in claim 3, said radially inner space confining face (17a) being provided by a radially inner sleeve member integral with said carrier member (16).

5. A damping unit as claimed in claim 3, said radially outer space confining face (17b) being provided by a radially outer sleeve member integral with said carrier member (16).

6. A damping unit as claimed in claim 1 said valve members (9,10) being rotatable with respect to said carrier member (16) without substantial variation of the flow resistance for said damping fluid across said piston unit (2).

7. A damping unit as claimed in claim 1 said compression springs (11) being helical compression springs.

8. A damping unit as claimed in claim 1 the valve face (21) of at least one of said annular valve members (9,10) being provided with a radially inner annular recess (23) and with a radially outer annular projection (30), said radially outer annular projection being provided with radially extending grooves (13) distributed about the circumference of said projection (30), said axial bores (6) being substantially in axial alignment with said annular recess (23).

9. A damping unit as claimed in claim 1 at least one of said valve members (9,10) having a rigid structure.

10. A damping unit as claimed in claim 3 at least one of said valve members (9,10) having an end face (9a,10a) remote from the respective valve face (17c), said end face (9a,10a) being substantially coplanar with a respective end face (22) of said carrier member (16) in the respective opening position.

11. A damping unit as claimed in claim 10, at least one of said annular valve members (9,10) having an inner diameter larger than the diameter of said radially inner space confining face (17a) and having axially extending grooves (12) in its radially outer peripheral face (20), an annular gap (15) being confined between the radially inner peripheral face (9b) of said valve member (9,10) and the radially inner space confining face (17a), said annular gap (15) being substantially closed in said opening position of said valve member (9,10) by an abutment face fixed with respect to said piston rod (3) and substantially coplanar with said end face (22) of said carrier member (16).

12. A damping unit as claimed in claim 1 said damping fluid being a damping liquid.

* * * * *